United States Patent [19]

Pezzi

[11] 4,314,335
[45] Feb. 2, 1982

[54] MULTILEVEL PRIORITY ARBITER

[75] Inventor: Louis D. Pezzi, Freehold Township, Monmouth County, N.J.

[73] Assignee: The Perkin-Elmer Corporation, Norwalk, Conn.

[21] Appl. No.: 118,879

[22] Filed: Feb. 6, 1980

[51] Int. Cl.[3] ............................................. G06F 9/46
[52] U.S. Cl. ................................................... 364/200
[58] Field of Search ... 364/200 MS File, 900 MS File

[56] References Cited

U.S. PATENT DOCUMENTS 4,144,563  3/1979  Hever et al. ......................... 364/200

Primary Examiner—Raulfe B. Zache
Attorney, Agent, or Firm—S. A. Giarratana; E. T. Grimes; J. D. Crane

[57] ABSTRACT

A multi-level arbiter for resolving multiple requests for access to a shared facility. The arbiter includes a plurality of loop arbiters, each including a polling circuit to test each of a plurality of units for a request for access to the shared facility. The first unit encountered by the polling circuit on each loop which has a request for service active is conditioned to utilize the shared facility as soon as the central arbiter grants the request for service to the loop. The central arbiter assigns priority among the loop arbiters.

10 Claims, 6 Drawing Figures

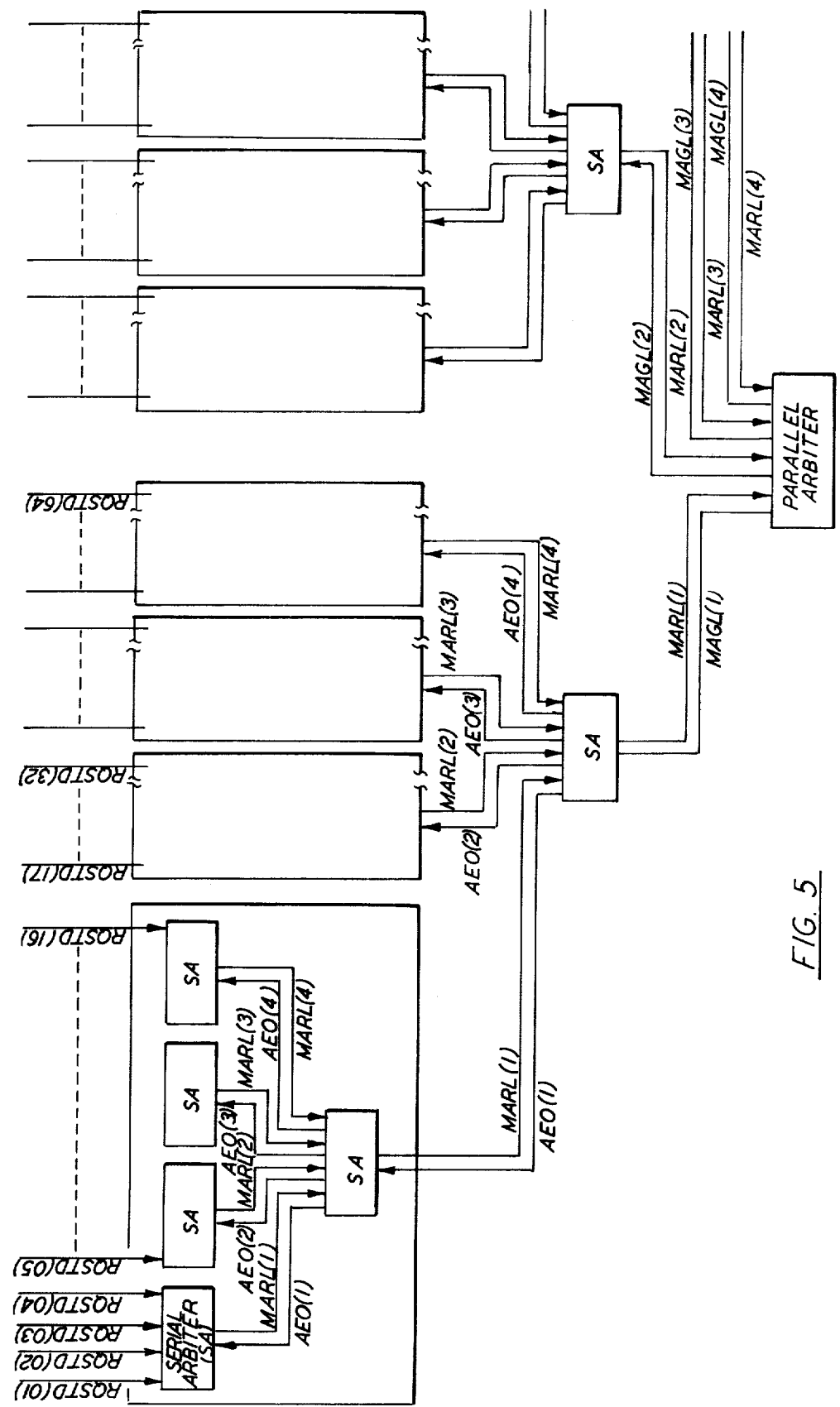

MULTILEVEL PRIORITY ARBITER

BACKGROUND OF THE INVENTION

The present invention relates generally to the field of digital computers and particularly to a circuit for resolving contention within a queuing system for use of a shared facility, such as a data bus to and from a common memory, among a plurality of system elements which collectively produce a random rate of request for access to the shared facility.

In digital computer systems and especially systems which have parallel processing capability or multiplexing communication channels, circuits have been developed to resolve simultaneous requests for use of a shared facility such as a data bus. Such circuits, commonly known as Bus Access Controllers, must establish the required priority hierarchy and a means for arbitrating simultaneous bus access requests. Since the arrival time for bus access requests is aperiodic, and at times will exceed the rate which the shared facility can service such requests, a queuing system is thus established. Request queuing requires that units which require fast bus access be given priority at the next request polling sequence.

When the request queue is empty, bus access will be granted to the next unit or units which make a request. In this case controls are required to eliminate ambiguity of access grant when multiple unit access requests are made simultaneously.

Approaches for solving contention for simultaneous access to a shared facility generally use a polling circuit where each request initiates a polling cycle. Such polling circuits fall into two general categories usually referred to as serial and parallel arbiters. In a serial arbiter the polling signal propagates through all the units coupled thereto and the first unit with a request outstanding blocks further propagation of the polling signal and initiates the desired use of the shared facility. Systems using such serial arbiters have slow arbitration speed but economy is achieved by having fewer circuits and control lines on the bus. This approach is quite useful for controlling asynchronous data transfers over a multiplexed bus, for example, but is not always suitable in environments requiring high speed access to the shared facility.

In attempting to improve access time and thereby data transfer capability over a common facility such as a data bus, priority schemes employing parallel arbiter circuits have been developed to grant access to the common facility, first to the unit having highest priority and thereafter to units of successively lower priority thereafter. Such circuit arrangements, however, typically require extensive backpanel signal interconnections and component counts in order to resolve priority amongst a plurality of requesting units. This increased number of circuits has given rise to higher manufacturing cost and has additionally given rise to some reduction in performance due to the fact that several logic circuit levels will be required to resolve contention amongst a plurality of units when the number of contending units becomes quite high.

Accordingly, it is the primary object of the present invention to provide an arbiter for resolving multiple simultaneous access requests for use of a common facility from a plurality of system components which have differing speed requirements for access to the common facility.

It is still a further objective of the present invention to provide an arbiter for resolving multiple simultaneous access requests to a common facility which maximizes performance of the system while keeping circuit costs and interconnection to a level normally found only in slower single level serial arbitration implementations.

SUMMARY OF THE INVENTION

The foregoing and other objectives, advantages and the features of the present invention are achieved by the multi-level arbiter system of the present invention which includes a plurality of loop arbiters. Each loop arbiter includes circuitry for awarding access to a common facility to one of a plurality of externally coupled units. Each loop arbiter includes a plurality of latches for responding to externally generated request signals from external units. The request latches produce a unit request signal and a loop request signal. The unit request signal is utilized by a priority resolution circuit to condition the loop arbiter to grant access to the common facility to the unit producing a unit request signal having the highest priority of all those units producing a unit request signal at the time the loop is polled. The loop request signal is used by a central arbiter to grant access to the shared facility upon receipt of an externally generated loop request signal with access being granted to the loop having the highest priority. The central arbiter establishes a fixed priority sequence amongst the loop arbiters producing a loop request signal at a given moment in time. The central arbiter responds to all such loop request signals present at the given moment of time by polling and latching all such requests and issues a loop grant signal to the loop having the highest priority among all loop arbiters presenting a loop access request signal thereto. Thereafter successively lower priority loops are handled before another polling sequence is made by the central arbiter.

DESCRIPTION OF THE DRAWING

The invention is described below in further detail in connection with the drawings which illustrate a preferred embodiment of the invention and form a part of the disclosure wherein:

FIG. 3a illustrates the manner in which controllers of the circuitry of FIG. 3 are interconnected with other controllers to form a loop;

FIG. 5 illustrates a four level arbiter network.

DETAILED DESCRIPTION

Figure 1:
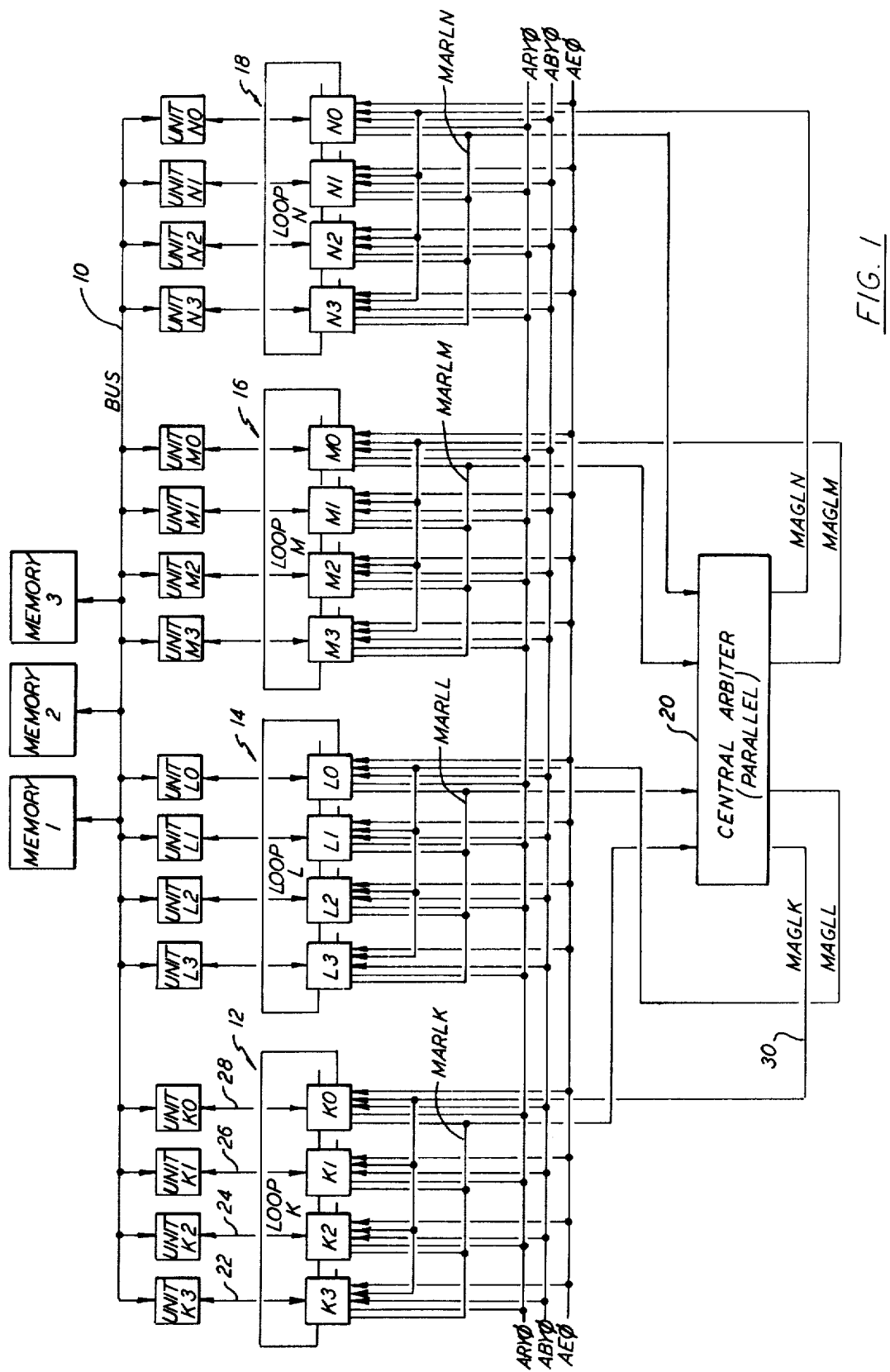
FIG. 1 is a block diagram of the system according to the present invention.

FIG. 1 illustrates the system of the present invention wherein the shared facility comprises a bus 10. Those of skill in the art will realize that the selection of a data bus as the shared facility is merely exemplary of one type of system element which might be shared by a plurality of system components and that the principles of the present invention will apply to the sharing of other types of facilities.

The bus 10, in typical computer systems, comprises a plurality of wires which interconnect the system components, such as processors and memories, and provides a path for communication of control information, data as well as address information between the system components. The exact protocol of the bus 10 need not be described here as it forms no part of the present invention. However, communication over the bus 10 is permitted only when a requesting unit is granted priority by the system arbiter.

The system arbiter of the present invention as illustrated in FIG. 1 is divided into four loop arbiters 12, 14, 16 and 18 as well as a central or parallel arbiter 20. From the subsequent discussion, it will become clear to those of skill in the art that the present invention may be constructed with a single central arbiter and either more or fewer loop arbiters coupled to the central arbiter.

Each loop arbiter, with loop arbiter 12 being exemplary, is coupled to 4 external system units such as unit K3, unit K2, unit K1, and unit K0 by lines 22, 24, 26 and 28 respectively. Each unit comprises a system element that may desire access to a common facility such as a printer which requires data to be printed, the data coming from a memory over the shared facility (bus 10). Each loop arbiter can be designed easily to couple to either more or fewer units. A request for access to the bus 10, for example, is transmitted from unit K3, unit K2, unit K1 or unit K0 over lines 22, 24, 26 or 28 respectively to the loop arbiter 12. The loop arbiter 12 transmits a loop request signal, in response to a bus request from any unit coupled thereto, to the central arbiter 20 via the line 30 designated marlk for Memory Access Request Loop K. At the same time, the loop arbiter 12, by a polling circuit described in greater detail below, determines which unit coupled thereto, and next in turn, has a bus request outstanding. Service is granted to the next unit in turn when the unit currently in possession of bus 10 is ready to release it.

The central arbiter 20, in response to a request for access to the bus 10 from any of the loops, is operative to produce a memory access grant signal to one of the loops. The loop selected for receiving the grant signal is the one which has the highest priority amongst those having an access request pending at a moment in time when the central arbiter 20 determines priority. For the embodiment illustrated in the figures attached hereto, loop K has the highest priority and loop N has the lowest priority with loops L and M being intermediate thereto with loop L having the second highest priority and loop M having the third highest priority. In the event that the central arbiter 20 determines that loop K has a request pending, the central arbiter 20 will produce a memory access grant to loop K on line 30. On the other hand, should the central arbiter 20 determine that loop L is the highest priority loop having a request pending at any moment in time, the central arbiter 20 will produce a memory access grant signal to loop L over line MAGLL. Should the central arbiter 20 determine that loop M is the highest priority loop having a request pending at any moment in time, a grant signal is sent over the line labeled MAGLM. Finally, if loop N is the highest priority loop having a request pending at a given moment in time, the central arbiter 20 will transmit a grant signal over the line designated MAGLN.

As will become clearer from the more detailed discussion of the central arbiter 20 which is set forth below, the central arbiter 20 analyzes all requests pending at a given moment of time and then subsequently issues a grant signal to each of the loops having a request pending at that moment of time wherein the grant signals are transmitted first to the highest priority loop and, after the highest priority loop has been serviced, access is granted to successively lower priority loops until all loops having a request pending at that moment of time have been granted. Thereafter, the central arbiter 20 again determines the loops having requests pending and these requests will be honored in order of the established priority by the transmission of a grant signal thereto.

Figure 2:
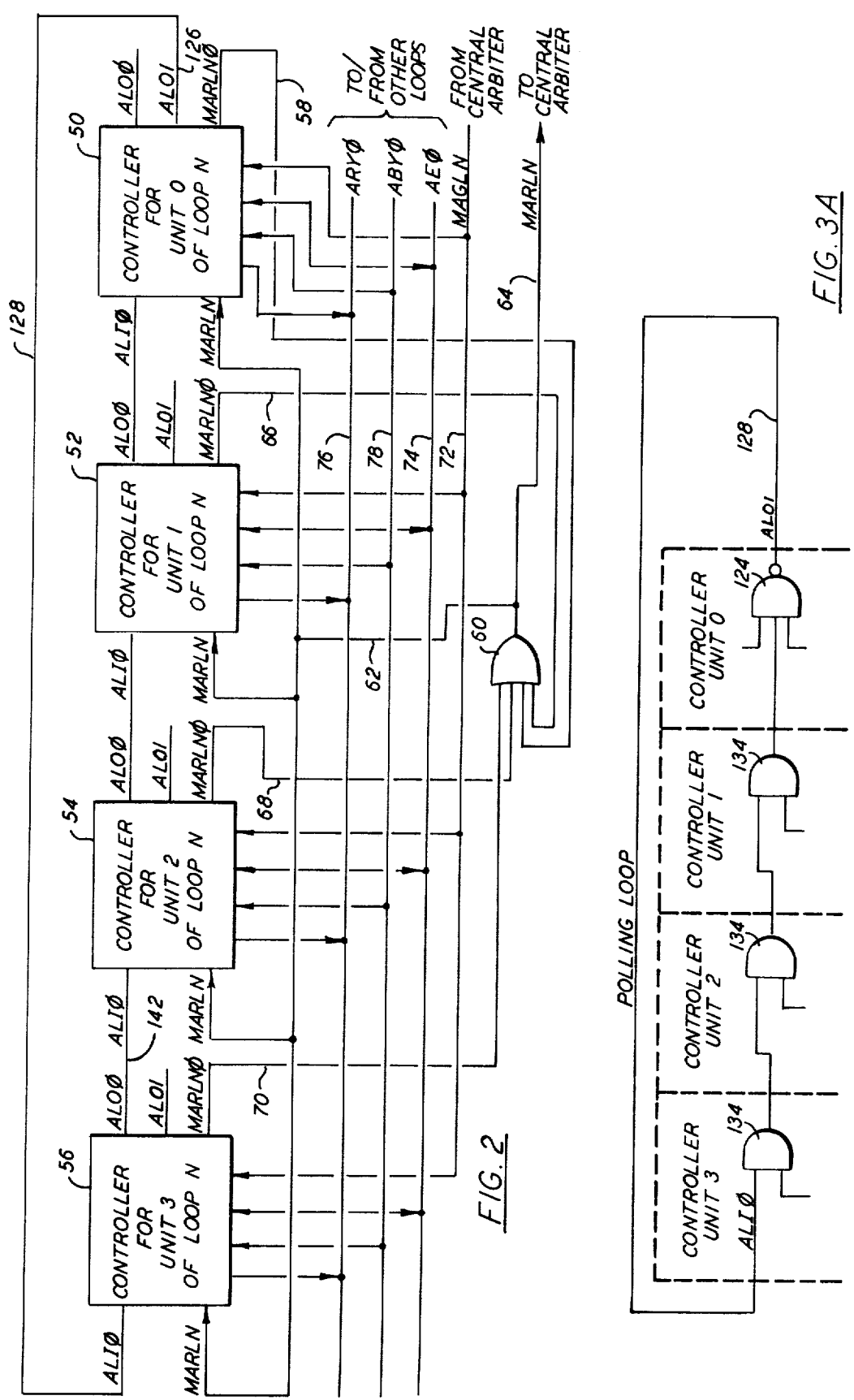
FIG. 2 is a block diagram of a loop arbiter according to the present invention.

Referring now to FIG. 2, the interconnection of four typical controllers for requesting external units coupled to a given serial loop arbiter is shown. In particular, this serial arbiter includes a controller for unit 0 of loop N designated 50, where Unit 0 is the first member of the loop to be polled, a controller for unit 1 of loop N designated 52, a controller for unit 2 of loop N designated 54 and a controller for unit 3 of loop N designated 56 where unit 3 is the last member of a loop to be polled. When controller 50 detects a request to access the common facility such as a memory bus, an access request signal is placed on the line 58 which comprises one input to the OR circuit 60. This OR circuit 60 then places a signal on the line 62 designated MARLN which comprises an input to each of the units 50, 52, 54 and 56. The signal on the line 62 initiates a polling cycle for loop N, in a manner described hereinafter in greater detail, which causes one of the controllers 50, 52, 54 or 56 to become conditioned to respond to a "grant" signal from the central arbiter thereby allowing access to the shared facility. The loop request signal for service to the Central Arbiter appears on the line 64 designated MARLN, a mnemonic for Memory Access Request Loop N.

As will be evident to those of skill in the art, controllers 52, 54 and 56 are each capable of making requests for access to the common facility as well and these requests respectively appear on the lines 66, 68 and 70 which are each coupled to input of OR circuit 60.

In the event that the central arbiter determines that the unit requesting service from loop N is to be granted priority and, therefore, access to the shared facility, the central arbiter places a "grant" signal on the line 72 which is designated MAGLN corresponding to Memory Access Grant Loop N. Line 72 is coupled to each of the controllers 50, 52, 54 and 56. As will be described in greater detail later, the unit of loop N requesting service and having the highest priority on the loop will respond to the "grant" signal on line 72 and produce a signal on the line 74 designated AEO which indicates that one controller has set its facility capture latch thereby inhibiting all other attempts to capture the facility. This is accomplished by reason of the fact that the line 74 couples to each of the controllers 50, 52, 54 and 56 and additionally is coupled to all other controllers on all other loops coupled into the system. The signal on line 74 blocks any other facility capture latch from being set.

Once this facility capture signal has been placed on the line 74 indicating that one of the units has captured the shared facility which is an address and command bus for the illustrated embodiment of the invention, the controller then proceeds to place address and commands on the bus coupled thereto and subsequently produce a signal on the line 76 designated ARYO which is a signal transmitted onto the bus to indicate that the data then appearing on the bus is valid.

In the event that the unit sought to be communicated with is for some reason busy and is incapable of responding to the data placed on the data bus by the requesting controller of Loop N, an abort signal is transmitted from the shared facility over the line 78 labeled ABYO. This abort signal indicates the requested shared facility has for some reason aborted its operation and the controller responds thereto by assuring that the unit requesting service releases the bus to other units requesting the shared facility. Since there may be multiple memory banks the unit which receives an ABYO must relinquish the bus so that other units may attempt a successful access to a memory bank which is not BUSY. Memory banks are normally busy when their address and command queue is full. If the unit sought to be communicated with accepts the request for service it will respond with a signal denoting acceptance of the request. This signal is labeled ARO (Address Received).

Line 100 couples to one input of a three input NAND gate 102. Under circumstances when a request is not present as indicated by a high level on line 100, the input levels on lines 104 and 106 are also high. Accordingly, the output 108 from NAND gate 102 is low which couples to one input of a second NAND gate 110 whose output 112 couples to the line 106 and is high. This comprises the reset state for the request latch formed by the interconnection of NAND gates 102 and 110.

When a request is not present, the line 108 is low. This condition is coupled by way of line 114 to one input of a NAND gate 116. The output of the NAND gate 116 goes high and the condition is coupled by a line such as 58, 66, 68 or 70 in FIG. 2 to the negative OR gate 60. In situations where no requests are pending, all inputs to the OR gate 60 are positive and, therefore, the output 62 and 64 is positive. The output 62 in FIG. 2 couples to the line 118 or FIG. 3 for each of the controllers in a given loop. The signal on the line 118 is inverted by the inverter receiver 120 and coupled by the line 122 to one input gate 124. Since the level on the line 118 is high when no request is pending, the level on the line 122 is inverted therefrom thereby inhibiting NAND gate 124 and making the output thereof on line 126 high. Controller 0 of FIG. 2 has its output line designated ALO1, however, this line corresponds to line 126 of FIG. 3.

The line 130 couples to the clock input of a negative edge JK flip flop 132 as well as to one input of the AND gate 134, the 30 nanosecond delay 136 and the NAND gate 138. Under conditions where no request is present, the line 130 is high, the JK flip flop 132 is reset thereby making its output $\overline{Q}$ high so that the output fron AND gate 134 on line 140 also high. The line 140 in FIG. 3 for controller 3 of FIG. 2 corresponds to line 142 which couples to the input labeled ALI0 for controller 2 of FIG. 2. This line 142 couples to the line 130 of the circuitry of FIG. 3 corresponding to controller 2 of FIG. 2. A similar interconnection will occur between the circuits of controller 2 and controller 1. Accordingly, a loop is established having an AND gate as 134 of FIG. 3 in controller 3 of FIG. 2, an AND gate such as 134 in controller 2 of FIG. 2, an AND gate such as 134 in controller 1 of FIG. 2 and a NAND gate such as 124 of FIG. 3 for controller 0 of FIG. 2. This arrangement is shown schematically in FIG. 3a.

Figure 3:
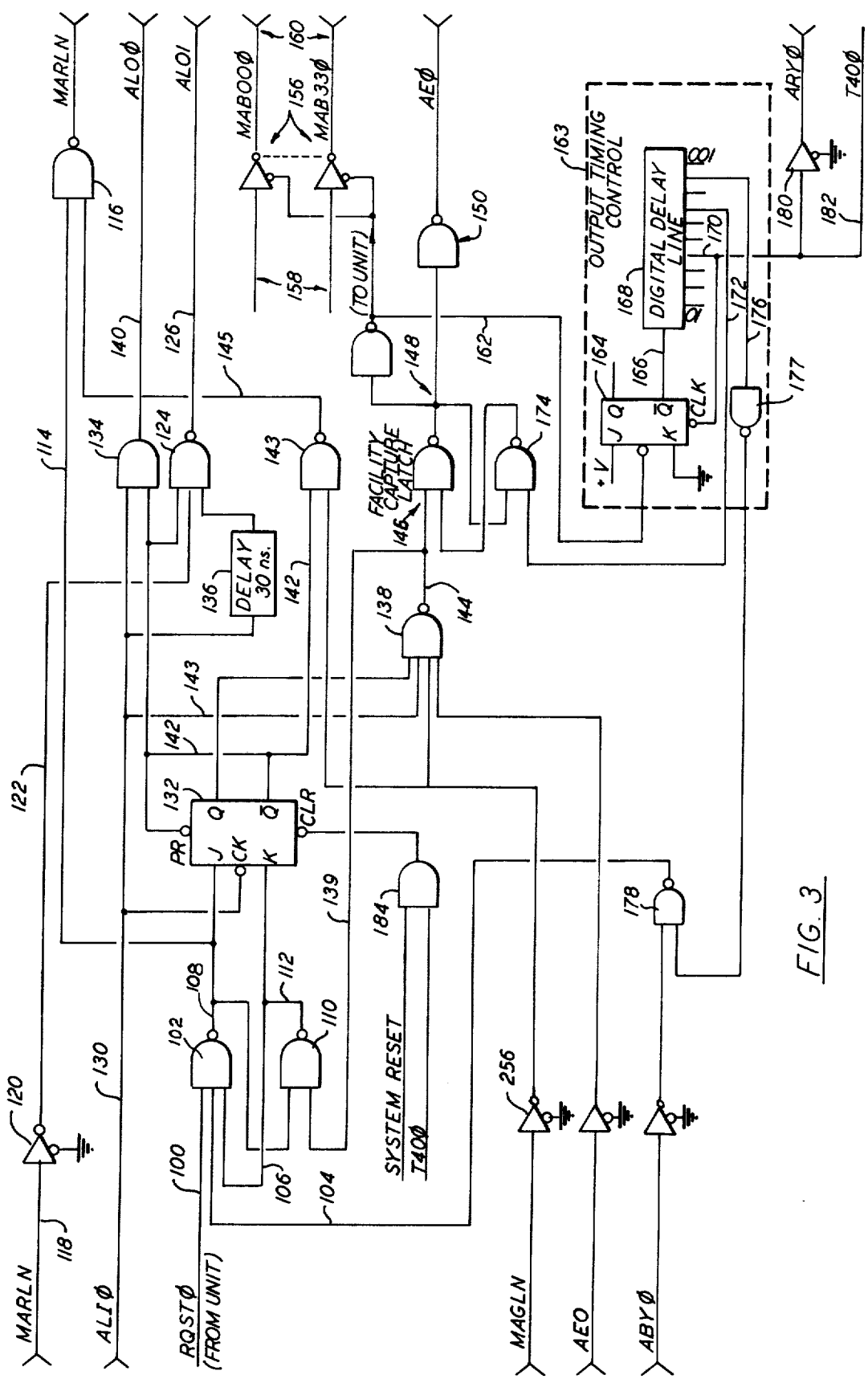
FIG. 3 is a detailed circuit embodiment of a controller within the loop arbiter according to the present invention.

When a request is received at any one of the controllers, the line 100 in FIG. 3 for that controller goes low thereby causing the output of NAND gate 102 to go high thereby producing a unit request signal on line 114. This unit request signal is also transmitted to the NAND gate 110 which drives its output 112 low thereby causing the request latch comprising NAND gate 102 and 110 to become "set".

The J and K inputs to the JK flip flop 132 are respectively coupled to the lines 108 and 112 so that the J input is high and the K input is low. This condition will be discussed shortly.

The high or unit request signal appearing on line 108 is coupled by line 114 to the NAND gate 116 whose other input is usually high and is inverted thereby. This low signal on line MARLN is then coupled by the line 118 to the inverter receiver 120 of the controller 50 on loop N causing a high signal to appear on line 122 which couples to the NAND gate 124. Since the other two inputs to NAND gate 124 are also high, the output on line 126 goes low thereby creating the polling signal which originates in the controller or unit 0 on the loop as shown in FIG. 2. The polling signal is transmitted over a polling line 128 in FIG. 2 to the input line designated ALI0 of the controller for unit 3. As indicated earlier for controller 3, the line designated ALI0 corresponds to line 130 of FIG. 3. The negative going pulse appearing on line 130 is applied to the clock of JK flip flop 132 which becomes set in accordance with the setting of the request latch comprising NANDs 102 and 110. Specifically, if a request has been set into the request latch, the J input will be high and the K input will be low. When the negative going pulse appears on line 130, the JK flip flop 132 becomes set so that the Q output goes high and the $\overline{Q}$ output goes low. If a request has not been latched by NANDs 102 and 110, the Q and $\overline{Q}$ outputs of flip flop 132 are reversed from that when a request is latched. When a request is latched, the low output from $\overline{Q}$ is coupled by line 142 to one input of AND gate 134 and to an input of NAND gate 124. Accordingly, the output on line 140 which already is at a low level, remains there until the JK flip flop 132 is reset.

The negative going polling signal appearing on the line 140 is transmitted to similar circuitry in controller 2 which also causes the JK flip flop 132 therein to be set in the event that the request latch in that controller is also set. In a similar manner the polling signal propagates to all the controllers.

It will be noted that during the polling cycle, the negative going polling pulse has a duration in excess of 30 nanoseconds due to the delay 136 in unit 0 of the loop plus the cumulative delay of NAND 124 of unit 0 and of the gates 134 of units 1, 2 and 3. Upon completion of the 30 plus nanosecond delay, the output of delay 136 drives one input to the NAND gate 124 low thereby causing its output at 126 to go high, This high signal is transmitted via line 128 of FIG. 2 to line 130 for unit 3 of the loop. This high signal on line 130 is transmitted by line 143 to one input of NAND gate 138 forming one of the four required conditions for producing a bus capture signal at the output thereof 144. In the event that a request is pending in unit 3, the Q output of JK flip flop 132 is also high thereby providing a second input to NAND gate 138. The two remaining conditions required to set the bus capture latch, indicated generally at 146, are the recept of a signal designated MAGLN which comprises a memory access grant to loop N from the central arbiter which is a signal generated therein in a manner to be described later. The other input required to meet all the conditions for NAND gate 138 is that the line designated AE0 must be high. This condition exists when no other unit coupled to the shared facility is currently granted access thereto.

It will be noted that when JK flip flop 132 is set, $\bar{Q}$ is low so that line 142 is also low. This low signal on line 142 blocks AND gate 134 and NAND 124. Accordingly, the first controller in the loop to have its JK flip flop 132 set drives line 130 in all subsequent controllers low so that the bus capture latches 146 therein cannot be set. Therefore, the loop hardware provides priority resolution among the units coupled thereto with priority being awarded in order of priority to units 3, 2, 1 or 0.

When all four inputs to NAND gate 138 are high, a low signal appears at 144 which sets the bus capture latch 146 thereby producing a high signal at the output 148. This high output at 148 is inverted by the inverter circuit 150 to produce a low signal on the line designated AE0 which thereafter prevents any other unit from being coupled to the shared facility. The high signal at 148 is also inverted by inverter 152 to produce a low on line 154 which is shown coupled to a plurality of tristate inverter drivers indicated generally at 156. These tristate inverter drivers 156 are made operational by the low level signal on line 154 so that data appearing on the lines indicated generally at 158 is coupled to the shared facility which, in this case, comprises the memory address bus MABXXX indicated generally by the lines 160. When the output at line 154 is high, however, the inverter drivers 156 are not operational so that data on the lines 158 are not transmitted to the bus 160.

The negative going pulse appearing at the output of NAND gate 152 is transmitted by the line 162 to the output timing control 163 which has a JK flip flop 164 which is set by the leading edge of the negative going pulse on line 162. When this occurs, the $\bar{Q}$ output of JK flip flop 164 produces a negative going pulse on line 166 which is coupled into the delay line 168. A negative going pulse, called T400, appears 40 nanoseconds after the line 166 goes low on the line 170 which is coupled back to the clear input to the JK flip flop 164 thereby causing it to be reset and driving the output on line 166 positive. Accordingly, the pulse T400 with its duration of about 40 nanoseconds is developed in the delay line 168 and is transmitted through driver 180 as signal ARY0. The signal ARY0 indicates the data on the bus 160 is valid. At the same time, the negative going pulse appearing on line 182 designated T400 is coupled to the input to AND gate 184 which drives the clear input to the JK flip flop 132 low thereby resetting it. The reset JK flip flop 132 then has its Q output low and it $\bar{Q}$ output high. When this occurs, the input condition to the NAND gate 138 changes so that its output goes high. This high level is coupled by line 139 to the input of NAND 110 which causes the request latch comprising NANDs 102 and 110 to be reset.

After a delay of 70 nanoseconds from the start of the pulse at 166, line 172 goes low thereby driving one input to NAND gate 174 of the bus capture latch 156 low. This will reset the bus capture latch 146 thereby causing the voltage at 148 to fall and the output of inverter 150 to go high thus freeing the facility capture latches for other units permitting other units to capture the shared facility.

After a 90 nanosecond delay, a negative going pulse appears on line 176 and is inverted by inverter 177 and which in turn enables the NAND gate 178 thereby enabling any low level operation abort signal on line ABY0 at that time to again set the request latch including NAND gate 102 and 110. Thus if the requested shared facility is unavailable as indicated by the abort signal, then the request latch is again set thereby allowing the request to be reinstated at a later time.

The output timing control 163 described above is exemplary of one such control and how it interacts with the remaining circuitry. Where a particular unit requires transmission of address information as well as data information. The control 163 would be designed to extend the duration of the AE0. The address would be placed on the bus 160 and thereafter the data would appear on the bus. The line ARY0 would indicate by a low level that address information on bus 160 is valid. The delay 168 would latter produce another signal similar to ARY0 to designate at that time that the Data on bus 160 is valid write data.

As indicated earlier, when a request is generated by a unit on a given loop, that request is transmitted to the central arbiter over a line in FIG. 2 designated MARLN. The memory access request from loop N signal, which comprises a low level signal, is inverted by the inverter 200 in FIG. 4. In a similar manner, the memory access requests from loops K, L and M are received respectively on lines MARLK, MARLL and MARLM. An inverter in each such line produces an inverted signal on lines 238, 240 and 242 which are used in a manner described below in greater detail. Assuming that a request for service is outstanding from loop N, the inverted signal at the output of inverter 200 is coupled by line 202 to an AND gate 204 whose other input is coupled to a line 206 which is high whenever all the JK flip flops 208, 210, 212 and 214 are reset. This latter condition is true when there is no previous request pending from any of the loops coupled to the central arbiter of FIG. 4.

When the high signal appears on line 202 indicating the presence of a request for service from loop N, the output of AND gate 204 goes high so that the output of NOR gate 216 goes low. This low signal is transmitted by way of line 218 to NAND gates 220, 222, 224 and 226 thereby blocking these NAND gates and maintaining the output signal on the lines 228, 230, 232 and 234 high. This condition, it will be recalled, is coupled by an inverter driver such as 236 in FIG. 3 to a NAND gate such as 138 in each of the units of the 4 loops coupled to the central arbiter thereby blocking access to the shared facility.

The low signal on line 218 is also coupled to the clock input of all of the negative going edge triggered JK flip flops 208, 210, 212 and 214. These flip flops will be set respectively whenever a high signal appears on the lines 238, 240, 242 or 244 and the clock input is going negative.

Whenever any JK flip flop 208, 210, 212 or 214 is set, the Q output therefrom is high and the $\bar{Q}$ output is low. The low level signal from any one of the JK flip flops appearing at the $\bar{Q}$ output is coupled to a NAND gate 246 causing its output to go high. This high level is coupled by line 248 to one input of NAND gate 250 and to a 40 nanosecond delay circuit 252. The output of the delay 252 is coupled to a second input of the NAND gate 250 so that the output thereof on line 206 goes low about 40 nanoseconds after the signal on line 248 goes high. When the signal on line 206 goes low, the output of AND gates 204, 254, 256 and 258 goes low so that the output of NOR gate 216 on line 218 goes high thereby conditioning the NAND gates 220, 222 224 and 226.

As indicated above, when JK flip flop 208 is set by reason of a request being received on line 238 which itself conditions AND 258 and NOR 216 to produce a negative going signal on line 218, the output on line 260 goes high thereby conditioning NAND gate 220 to produce a low level on line 228 whenever the line 218 subsequently goes high. Under the same conditions, the output on line 262 from JK flip flop 208 goes low and this is coupled to one input of NAND gates 222, 224 and 226 thereby preventing the output on lines 230, 232, and 234 from going low. Accordingly, whenever JK flip flop 208 is set, a memory access grant signal is ultimately transmitted to loop K regardless of whether any other loop request is outstanding. In other words, loop K is granted, by the circuitry of FIG. 4, highest priority for use of the shared facility.

Whenever a memory access request is received from Loop L, the signal on line 240 is high which conditions AND 256 and NOR 216 to drive 218 in a negative direction. This causes JK flip flop 210 to become set thereby providing a high level signal on the line 264 and a low level on line 266. The high level on the line 264 is coupled to one input of NAND gate 222. So long as a memory access request is not pending for loop K, the line 268 is high. When the signal 218 goes high, then all the conditions are met so that NAND gate 222 produces a low level signal on line 230 which corresponds to a memory access grant to loop L.

In a similar fashion, when a request is received from loop M, the line 242 is high and the JK flip flop 212 becomes set because AND 254 and NOR 216 drive line 218 in a negative direction. This causes the output on lines 270 and 272 to respectively go high and low. So long as a request is not pending from either loop K or loop L, the lines 262 and 266 respectively are both high so that when line 218 goes high, the NAND gate 224 produces a low level signal on line 232 which corresponds to a memory access grant to loop M.

As indicated earlier, when a request is received from loop N, a high signal appears on line 244 which causes AND 204 and NOR 216 to drive line 218 in a negative direction which sets the flip flop 214. This condition is coupled by way of line 274 to the NAND gate 266. When the line 262 is high indicating a request is not pending from loop K, the second condition for NAND gate 226 is met. A third input to NAND gate 226 is formed by the AND gate 276 whose inputs are coupled to line 272 and 266. Whenever these inputs are high, the output of AND gate 276 is also high thereby providing the third condition to NAND gate 226. Thereafter, when line 218 goes high, the output of NAND gate 226 on line 234 goes low thereby providing a memory access grant to loop N.

Figure 4:
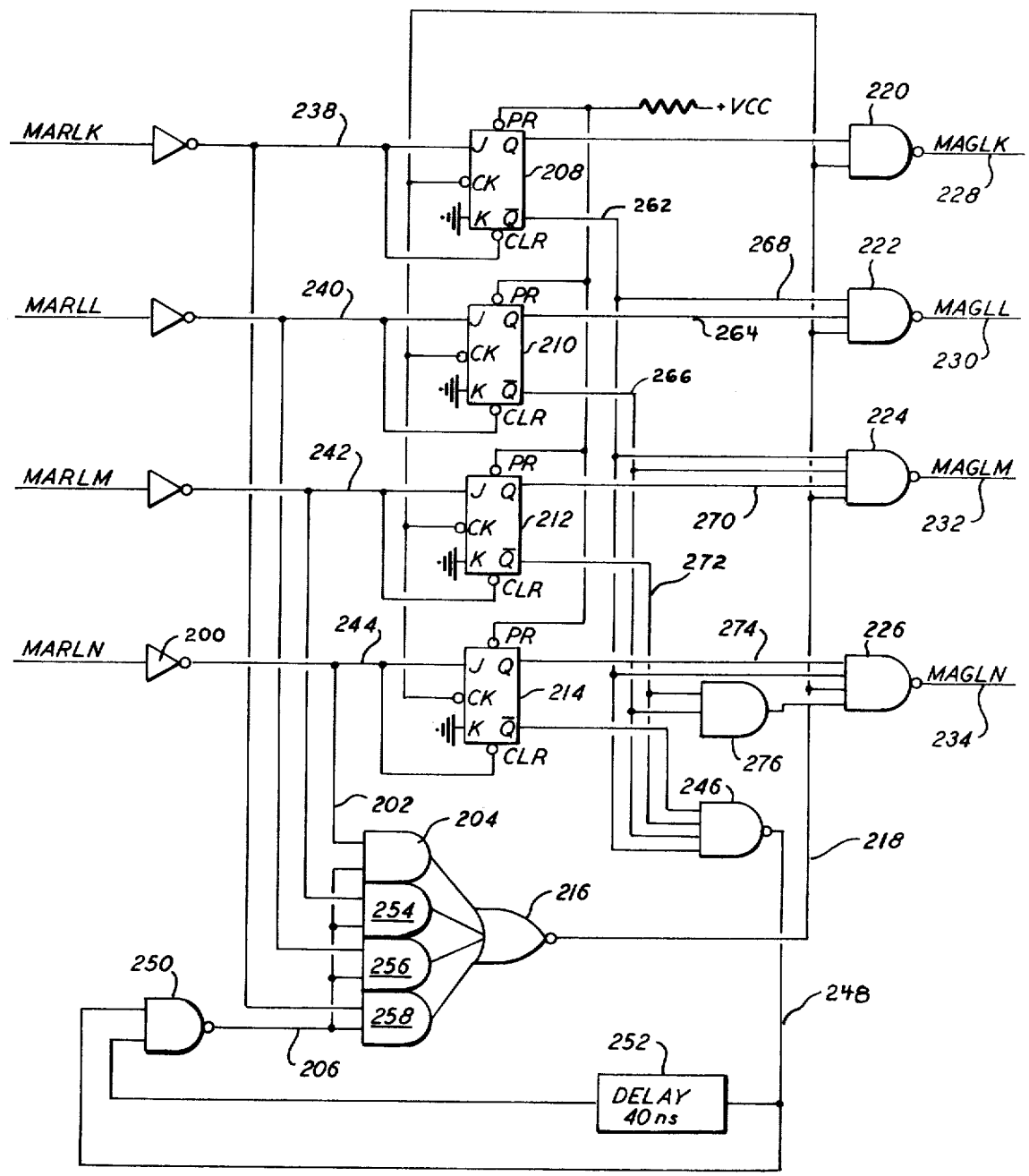
FIG. 4 illustrates the circuits required to construct a central arbiter according to the present invention.

From the foregoing analysis of the circuitry of FIG. 4, it is clear that loop K is granted the highest priority of the four loops coupled to the central arbiter. In descending order of priority, access to the shared facility is granted to loop L, loop M or loop N. Thus, the central arbiter is capable of granting access to only one loop at a time in reply to all of the pending loop access requests at a given moment in time. Once the access granted signal is transmitted back to the loop arbiter and access has been completed, the request from the requesting loop is withdrawn. Accordingly, if a request had been pending from loop K, the level on line 238 would have been high. However, once the request has been satisfied, the level on line 238 goes low because the loop controller withdraws the request in line MARLK thereby resetting JK flip flop 208 thus causing the output on line 262 to go high. This condition then permits any of the other loops to gain access to the shared facility provided one of the JK flip flops 210, 212, or 214 is set. Subsequent access to the shared facility, however, will continue to be granted to the other loops on the basis of the priority established by the circuitry of FIG. 4.

As will become clear from an investigation of FIG. 4, once all of the access requests which were previously latched by the JK flip flops 208, 210, 212 and 214 have been satisfied, the circuitry of FIG. 4 returns to a free mode of operation which permits the first access request received thereafter from any of the loops to initiate a new clock pulse on line 218 causing all requests appearing at the central arbiter at that time to be latched by the JK flip flops 208, 210, 212 and 214. Thereafter, these access requests are processed in the manner described above.

The foregoing description of the invention has made particular reference to the embodiment of the invention illustrated in the drawings. Those skilled in the art will readily recognize variations to the circuitry which may be employed to accomplish somewhat different functional requirements. An example of such a requirement becomes clear when the number of units which require access to a shared facility becomes vary large. The embodiment of a two level bus access arbiter network, as detailed herein, is quite efficient in both hardware utilization and arbitration delay time because the serial arbiter loops are small (4 units) and the complexity of the parallel arbiter is minimized. The two level embodiment falls short of these objectives when the number of units requiring access to a shared facility exceeds 32. With 32 units the loop size is eight and the arbitration time thus increases correspondingly to approximately 130 ns. Alternately, one may choose to increase the parallel arbiter to 8 inputs thus resulting in higher logic complexity and again a corresponding increase in arbitration time.

Optimization of arbiter networks properties for large numbers of units requiring access to a shared facility is accomplished through the use of multiple levels (>2) of serial arbiter loops. By referring to FIGS. 2 and 3, it is readily seen that multiple levels of serial arbiters may be interconnected wherein the request input RQSTO to serial arbiters below the first level is replaced by the MARL output of a serial arbiter at a level above it and wherein the loop grant signal MAGL input is replaced by an AE$\phi$ output of a serial arbiter at the next lower level.

A simplified block diagram of such a network is given in FIG. 5 wherein:
N = number of arbiter levels
U = total number of units requiring access to a shared facility
$i_k$ = request inputs per loop at level k
$l_k$ = number of loops at level k
$l_k > l_{k+1}$
$l_n = 1$ and $$U = \prod_{k=1}^{k=n} i_k$$

Example: If the total number of units (U) which require access to a shared facility is 256, let n = 4 and:
$i_1 = 4$, $l_1 = 64$ $i_2 = 4 \; l_2 = 16$
$i_3 = 4 \; l_3 = 4$
$i_4 = 4 \; l_4 = 1$ Level 1 would thus be 64 loops of 4 unit inputs each, etc. Level 4 would consist of a single four input parallel arbiter.

Note that the serial arbiter employed in levels below Level 1 is modified so that the AE$\phi$ signal output is not bussed. Instead, each AE$\phi$ acts as a grant signal (MAGL) for a loop at the next higher level.

Such modification of the circuits illustrated can easily be made by those skilled in the art without departing from the spirit and scope of the invention.

What is claimed is:

1. A multi-level arbiter system for resolving contention between a plurality of requests for access to a shared facility comprising, in combination:
   a plurality of loop arbiters each for awarding access to the shared facility to an external unit coupled thereto, each loop arbiter comprising, in combination;
   (a) a plurality of request latches, each responsive to one externally generated access request signal from an external unit coupled thereto and desiring access to the shared facility, each request latch producing a unit request signal and a loop request signal;
   (b) a priority resolution circuit responsive to each unit request signal for conditioning the loop arbiter to grant access to the shared facility to the unit having the highest priority of those units then producing a unit request signal upon receipt of externally generated loop grant signal; and
   a central arbiter responsive to each said loop request signal from all said loop arbiters to produce a loop grant signal to the loop arbiter producing a loop request signal and having the highest priority among all said loop arbiter request signals present at that moment of time.

2. The multi-level arbiter of claim 1 wherein said central arbiter includes means to latch each said loop request signal present at a given moment of time.

3. The multi-level arbiter of claim 2 wherein said central arbiter includes means responsive to said latched loop request signals to produce a loop grant signal to the loop having the highest priority among all said loop arbiters then having a loop request signal latched in one said loop request latch.

4. The multi-level arbiter of claim 1 wherein said priority resolution circuit includes means for capturing the shared facility and preventing units coupled to other loops from capturing the shared facility.

5. The multi-level arbiter of claim 1 wherein said priority resolution circuit includes a polling loop.

6. The multi-level arbiter of claim 5 wherein said polling loop includes circuit means associated with each external unit operable to prevent access to the shared facility by all units having lower priority than the highest priority unit causing one said request latch to be set.

7. A multi-level arbiter system for resolving contention between a plurality of units capable of simultaneously requesting access to a shared facility comprising, in combination:
   a plurality of loop arbiters, each for awarding access to the shared facility to one of a plurality of external units coupled to each said loop arbiter, each said loop arbiter comprising, in combination:
   (a) a request latch associated with each external unit coupled to each loop arbiter which becomes set in response to an access request signal received from the external unit coupled thereto, one said request latch being set causing a loop access request signal and a polling signal to be produced;
   (b) a second latch, associated with each unit coupled to each loop arbiter, each said second latch on each loop arbiter being triggered by said polling signal and becoming set when the unit coupled thereto has set said request latch coupled thereto;
   (c) a facility capture latch coupled to each said second latch, said facility capture latch being set whenever the second latch coupled thereto is set, no higher priority second latch on the same loop and coupled to another unit is set, no other facility capture latch is set and an externally generated loop grant signal is received, said facility capture latch initiates access between the unit associated therewith and the shared facility; and
   a central arbiter responsive to all said shared facility access request signals present at a moment in time from all said loop arbiters to produce a loop grant signal to the loop having the highest priority.

8. The multi-level arbiter of claim 7 wherein said central arbiter has a priority circuit for assigning priority for loop access requests.

9. The multi-level arbiter of claim 7 wherein said central arbiter includes a loop request latch responsive to each said loop access request signal, each said loop request latch being set by a gate signal which is produced whenever no said loop request latch is set and at least one loop access request is present.

10. A multi-level arbiter for resolving contention by a plurality of units coupled thereto for access to a shared facility, the arbiter comprising, in combination:
    a plurality of loop arbiters, each loop arbiter for resolving contention for access to the shared facility between the units coupled thereto, each said loop arbiter including:
    (a) a plurality of request registers, each said register being settable to indicate when a unit coupled thereto has a pending request for access to the shared facility;
    (b) a polling circuit responsive to any said request register becoming set to initiate a polling cycle to determine which said request registers are set, said polling circuit including a request latch coupled to each request register which becomes set during said polling cycle if the request register coupled thereto is set;
    (c) a facility capture latch coupled to each said request latch, each said facility capture latch being set only when, (1) no higher priority request latch coupled to the same loop arbiter is set, (2) the request latch coupled thereto is set, (3) no other facility capture latch is set and, (4) an externally generated facility access granted signal is received at all said facility capture latches on said same loop arbiter, said facility capture latch becoming set subsequently initiating access by the unit coupled thereto to the shared facility; and
    a central arbiter including a plurality of loop request latches each responsive to any said request register being set on a given loop to set said loop request latch and additionally including a priority circuit responsive to all said loop request latches to produce a facility access granted signal to the loop arbiter whose loop request latch is set and has the highest priority of all the loops whose loop request latch is set at that moment in time.

* * * * *